United States Patent
Steely, Jr.

(10) Patent No.: US 6,769,057 B2
(45) Date of Patent: Jul. 27, 2004

(54) SYSTEM AND METHOD FOR DETERMINING OPERAND ACCESS TO DATA

(75) Inventor: Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 09/766,685

(22) Filed: Jan. 22, 2001

(65) Prior Publication Data

US 2002/0099927 A1 Jul. 25, 2002

(51) Int. Cl.⁷ .............................................. G06F 9/312
(52) U.S. Cl. ...................................... 712/216; 712/214
(58) Field of Search ................................ 712/214, 215, 712/216

(56) References Cited

U.S. PATENT DOCUMENTS

| | | | | |
|---|---|---|---|---|
| 5,857,097 A | * | 1/1999 | Henzinger et al. | .......... 712/236 |
| 5,983,341 A | * | 11/1999 | Cheong et al. | ............. 712/216 |
| 6,098,166 A | | 8/2000 | Leibholz et al. | |
| 6,308,260 B1 | * | 10/2001 | Le et al. | ...................... 712/215 |
| 6,430,683 B1 | * | 8/2002 | Arimilli et al. | ............. 712/245 |

* cited by examiner

Primary Examiner—William M. Treat

(57) ABSTRACT

A "data verified", or DV, bit is included in an instruction to indicate if the instruction or a dependent instruction may be associated with the retrieved data as soon as the data is available or should instead be associated with the data after verification. If the DV bit is in a first state, e.g., not set, the system may issue instructions that use associated data as soon as the data is available. If the DV bit is in a second state, e.g., set, the system does not issue the instructions that use the data until the data is verified. The system or user sets the DV bit based on an analysis of an instruction set that includes the instruction and/or accumulated profile data from previous use or uses of the software. The DV bit is set in a LOAD instruction if the dependent user instruction is close enough in the instruction set that the user instruction is likely to issue before the data is verified and/or if the LOAD instruction is part of a relatively long chain of instructions. The DV bit may instead be set if past uses of the software indicate a complicated or time-consuming reissue operation is associated with a particular cache miss.

53 Claims, 4 Drawing Sheets

SYSTEM AND METHOD FOR DETERMINING OPERAND ACCESS TO DATA

BACKGROUND OF THE INVENTION

1. Field of the Invention

The invention relates generally to data processing systems and, more particularly, to systems that process instructions out of program order.

2. Background Information

Out-of-order processing systems execute program instructions in an order that allows for more efficient use of processor time. The system must, however, manage the processing to ensure that the program produces the same result that it would if the instructions were executed in program order. One such system is discussed in U.S. Pat. No. 6,098,166 which is incorporated herein by reference.

There are several steps involved in processing an instruction. Generally, to speed operations, the system is set up as a pipeline so that the processing of a given instruction may be started while other instructions are still being processed through the pipeline. One type of instruction of interest is a LOAD instruction that instructs a processor to retrieve data from memory and load the data into a designated general purpose register, or GPR. Operand instructions then make use of, that is, process, the data that is held in the register, and provide the results to the same or another GPR.

In high-speed multi-processor systems, each processor is typically associated with a cache memory. During a LOAD operation the processor looks to the cache memory for the data and, only as necessary, looks for the data in other layers of memory that take longer to access. The processor first retrieves data from locations in the cache memory that correspond to virtual address information in the LOAD instruction, and writes the retrieved data to the designated GPR. The processor also enters an associated address table and a translation buffer to retrieve a corresponding cache address tag and address translation information, respectively. The processor then translates the address tag in a known manner, to determine if the retrieved data is the requested data. If the processor verifies that the retrieved data is the requested data, i.e., confirms a "cache hit," the LOAD operation is essentially complete. Otherwise, the processor confirms a "cache miss," and the processor must then retrieve the requested data from one of the other layers of memory.

With a cache hit the data is available as soon as the data is retrieved from the cache and loaded into the designated GPR. To take full advantage of the reduced latency associated with the cache memory, the system should start processing instructions that make use of the data as soon as the data is loaded into the GPR. The risk, however, is that a cache miss has actually occurred and the data is invalid. Accordingly, the system must keep track of which instructions used the data before the processor has verified the data. As necessary, the system reissues the instructions if a cache miss is confirmed. A system for keeping track of the instructions that issued before the data is verified is discussed in the above-referenced patent. The number of instructions that must be reissued adds both to the delay and complexity associated with the reissue operations. In the patent, the period between the time the data is written to the designated GPR and the time the data is verified is referred to as a "speculative time window."

The system can be improved by including therein a mechanism that predicts the likelihood of a cache hit based on the immediate processing history. An analysis of such systems has shown, for example, that cache misses tend to occur in groups. The occurrence of one or more cache misses thus warrants the prediction that the next LOAD operation will also involve a cache miss. Accordingly, based on the prediction of a cache miss, the system waits for data verification after the next LOAD operation before issuing a next instruction that uses the data. In this way the system avoids having to reissue the instructions that are dependant on the LOAD operation. If the LOAD operation turns out to include a cache hit, however, the system has unnecessarily delayed processing the dependent instructions. Further, other processing operations may be delayed if some or all of the instructions queued for issue require the results of the dependent instructions.

The system changes its prediction of a cache miss after one or more cache hits occur. If the prediction is inaccurate, the system re-issues the dependent instructions, changes its prediction, and so forth.

While the prediction mechanism provides an improvement to system operations it does not, for example, aid the system in selectively issuing instructions to make more efficient overall use of the processors and/or in reducing the number of instructions that are involved in a given reissue operation.

SUMMARY OF THE INVENTION

The inventive system includes in an instruction a "data verified," or DV, bit that indicates if this instruction or a dependent instruction may be associated with the retrieved data as soon as the data is available or should instead be associated with the data after verification. If the DV bit is in a first state, e.g., not set, the system may issue instructions that use associated data as soon as the data is available. If the DV bit is in a second state, e.g., set, the system does not issue the instructions that use the data until the data is verified.

The system sets the DV bit based on an analysis of the instruction set and/or accumulated profile data from previous use or uses of the software. To analyze the instruction set, or a relevant portion thereof, the system determines which instructions depend on the data provided by a given LOAD instruction and/or where in the program the dependent instructions occur with respect to the LOAD instruction. In one embodiment the DV bit is set if the data are first required by an instruction that is part of a relatively long string of dependent instructions. This avoids potentially having to reissue all or part of the long string of instructions if a cache miss occurs.

The analysis of the instruction set may reveal that the first instruction that uses the data is widely separated from the LOAD instruction in the instruction set, and thus, not likely to be issued before the data is verified. The DV bit is then not set, even if the instruction is part of the long string of instructions. Similarly, the DV bit is not set if relatively few instructions use the data, because a reissue of the few instructions should not adversely affect processor operations if the data are later determined to be invalid.

As discussed in more detail below, the system may use the DV bits to aid in compiling the program, such that the dependent instruction and the LOAD instruction associated with a set DV bit end up relatively widely separated in the instruction set. The system can then issue the intermediate, independent instructions i.e., those that do not depend on the data, while the data verification function is performed.

The system may set the DV bit in instructions associated with cache misses that are predicted based on profile data from past uses of the software and/or set the DV bit based on a combination of the profile data and the separation of the LOAD instruction and the various dependent instructions, and so forth.

The system may include the DV bit in the LOAD instruction or in the operands that use the data. As discussed below, the system or a user sets the bit appropriately to indicate whether a given operand can or cannot be processed before the associated data is verified. For ease of understanding, the operands that use the data provided by a LOAD instruction are hereinafter referred to as "user instructions."

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
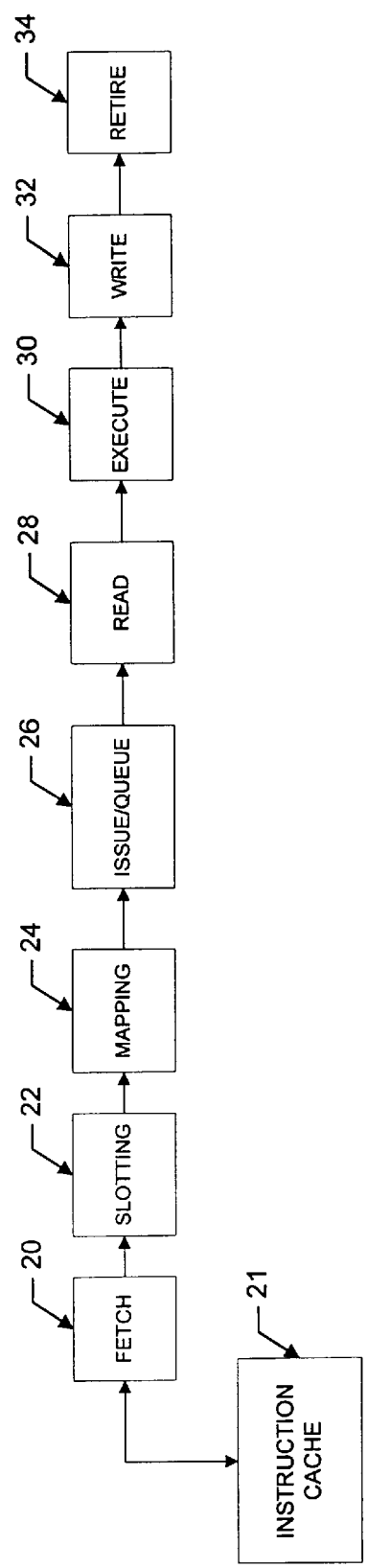
FIG. 1 is a functional block diagram of stages in a pipelined processing system constructed in accordance with the invention.
Figure 2:
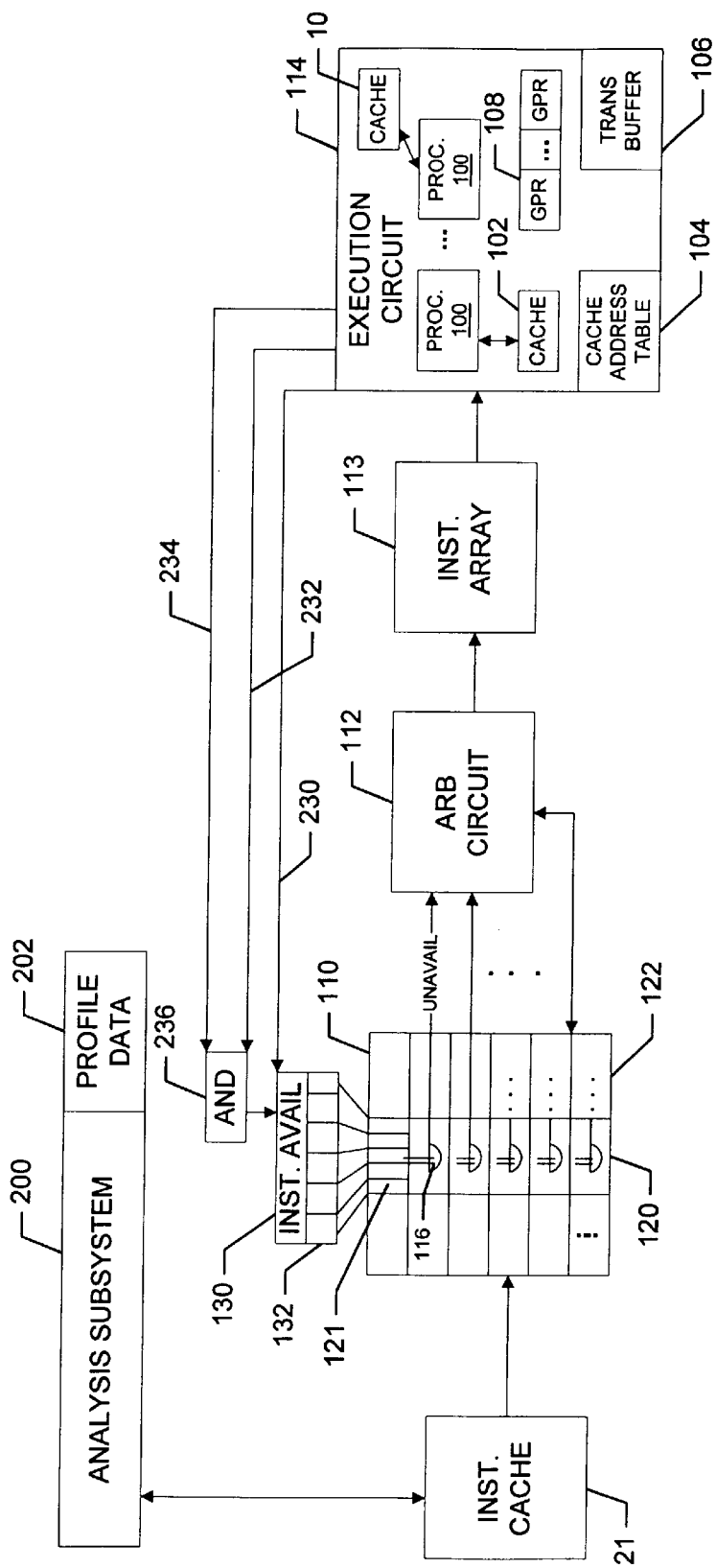
FIG. 2 is a functional block diagram of a system constructed in accordance with the invention.

FIG. 1 depicts the pipelined processing stages for instructions of a given program as a series of functional blocks. In a fetch stage 20 the system retrieves the instructions from an instruction cache 21, which contains all or part of the program of interest. The system next, in a slotting stage 22, assigns the instructions to respective processors 100 (FIG. 2). In a mapping stage 24 the system maps virtual address information associated with the instructions to physical general purpose registers (GPRs) that are associated with the various processors. In an issue/queue stage 26 the system queues and issues the instructions in an order that makes efficient use of processor time and corresponds to the states of DV bits in the various instructions, as set forth below. In the next stages 28, 30 and 32 the processors process the instructions by, as appropriate, reading data from the designated GPRs, executing the instructions and writing the results to the GPRs. The system then retires the executed instructions in a final stage 34.

Each stage of processing a given instruction is performed in different system operating cycles, with certain stages requiring more than one operating cycle. An instruction is typically fetched during one operating cycle, assigned to an execution unit during a next operating cycle, and so forth, with the execution stage taking one or more cycles depending on the type of instruction. While certain instructions are passing through the various stages of the pipeline other instructions are passing through earlier stages or are retiring at the end of the pipeline.

Referring also to FIG. 2, as part of the execution stage of a LOAD instruction an assigned processor 100 uses virtual address information that is contained in the instruction to retrieve data from an associated cache memory 102. The processor writes the data to the designated GPR 108 in a first execution cycle. The processor also retrieves an associated address tag from a cache address table 104 and translation information from a translation buffer 106 and, in a conventional manner, verifies whether the data held in the designated GPR is the requested data. In the example, the processor uses two additional cycles for data verification. Accordingly, the unverified data is available to dependant instructions in execution cycle 2, and the verified data is available in execution cycle 5. If the system waits until the data are verified before issuing a dependant user instruction, there will be a corresponding two cycle delay in the execution of the user instruction.

The system further includes an analysis subsystem 200 that enhances operating efficiency by analyzing the instruction set and/or profile data from past uses of the program, to determine whether a given user instruction should be associated with the data available in execution cycle 2 or the verified data available in execution cycle 5. If the data is to be verified before use, the analysis subsystem sets a data verification ("DV") bit in the LOAD instruction, the dependent user instruction or both.

Figure 3:
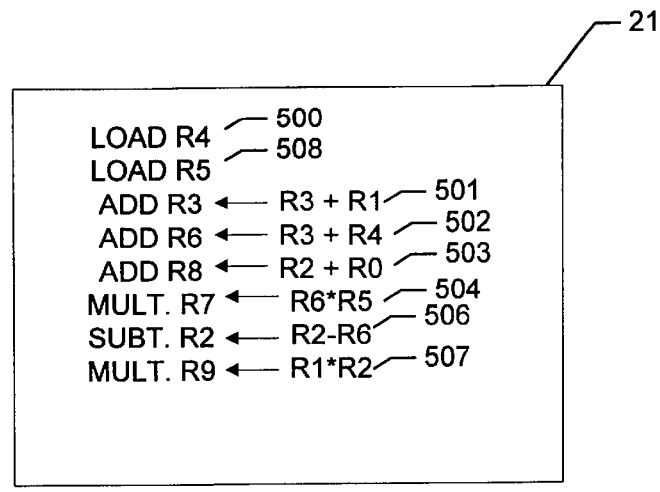
FIG. 3 is a more detailed diagram of an instruction cache.

Consider first that the system includes the DV bit in the LOAD instruction. Referring now also to FIG. 3, the analysis subsystem 100 determines how far apart a LOAD instruction 508 and a first dependent user instruction 504 are in the portion of the instruction stream that is held in the instruction cache 21. If the two instructions are far enough apart that it is unlikely that the user instruction will issue within the cycles required for data verification, the analysis system does not set the DV bit in the LOAD instruction. Accordingly, in the example, the DV bit is not set in the LOAD instruction 508. The system need not complete a trace through the instructions to a dependent user instruction if the dependent instruction is not found within a number of instructions that may issue in the speculation time window.

Figure 4:
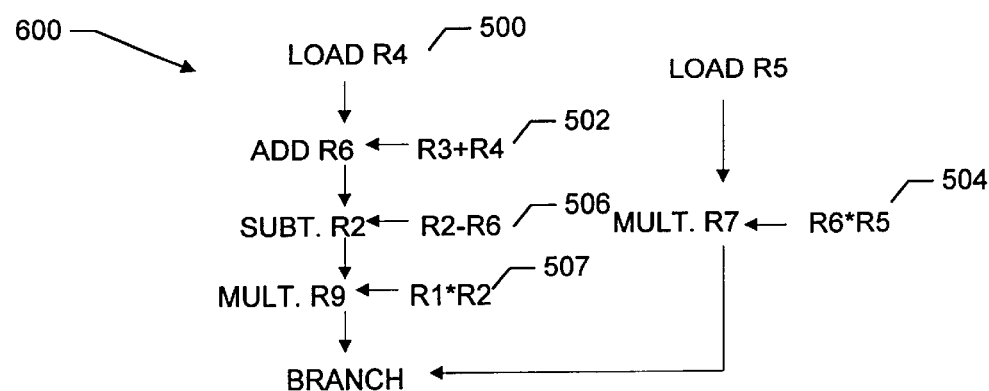
FIG. 4 is a diagram that illustrates instruction dependencies.

The analysis system may instead or in addition examine the ways in which the various user instructions 501–507 depend on one another and on the LOAD instructions 500 and 508. FIG. 4 illustrates diagrammatically the dependencies of the instructions that are held in the instruction cache 21 of FIG. 2. In the example, user instruction 502 depends from the LOAD instruction 500 and instructions 506–507 depend from the instruction 502. The user instruction 504 is the only instruction that depends from a LOAD instruction 508, however, instruction 504 depends also from instruction 502. The dependent instruction 502 thus is part of a relatively long instruction chain 600 and involves a dependency of the instructions in the chain 602. In the example, the subsystem sets the DV bit in the LOAD instruction 500, to avoid disruptions in the execution of both chains of instructions. The system thus prevents what would be a relatively time consuming and complex re-issue operation should a cache miss occur. The DV bit in the LOAD instruction 508 is not set, however, since the associated instruction chain 602 is both short and uncomplicated. Further, it is unlikely that the dependent instruction 504 will issue before the associated data verification operation is completed, since it requires the completion of instruction 502.

The analysis subsystem 100 may instead or in addition accumulate profile data 202 associated with prior uses of the software. For example, the subsystem monitors the program execution and the processing delays and other complications associated with reissue operations that correspond to particular cache misses. The subsystem then determines which user instructions should be associated with verified data, to avoid the more time-consuming and/or complicated re-issue operations. The subsystem may further determine which of the cache misses of interest are most likely, and set the data DV bits in instructions that are associated with the more likely of the cache misses of interest.

The system may also use the DV bits to aid in re-compiling the program. The compiler (not shown) orders the instructions so that a LOAD instruction that includes a set DV bit is, if possible, followed by at least the number of non-dependent instructions that fills the speculative time window. In this way, the system can issue the intermediate instructions while the data is being verified, and the processors are thus not idled.

In another embodiment of the system, the analysis subsystem 100 sets the state of a DV bit in the user instruction. The analysis subsystem thus determines if an associated LOAD instruction is within relatively close proximity to a given user instruction in the portion of the instruction stream that is held in the instruction cache 21. If so, the subsystem sets the DV bit in the user instruction. Otherwise, the system does not set the DV bit. The subsystem need not trace completely back to the LOAD instruction that is tied to the user instruction if the LOAD instruction does not occur in the instructions that are held in the instruction cache. Alternatively, the system may trace back from the user instruction through the maximum number of instructions that can occur in the speculative time window in search of the associated load instruction.

Referring again to FIG. 2, the DV bits are used in conjunction with other information in an issue queue table 110 to make instructions available or unavailable to an arbitration circuit 112. The issue queue table 110 contains a list of instructions to be executed by processors 100 that are included in an execution circuit 114. Each row of the table 110 corresponds to an instruction that has been slotted and mapped, in a known manner, for execution by a selected processor using data contained in a designated GPR 108.

The issue queue table 110 includes a column 120 that for each row identifies the GPR that is associated with the corresponding instruction, and a column 122 that identifies the processor 100 in the execution circuit 114 that will perform the corresponding instruction. Each row thus includes GPR bits or lines 121 and processor bits or lines 123.

The arbitration circuit 112 enters the table 110 using the processor identifiers and selects available instructions for processing by the respective processors. The arbitration is circuit then supplies the instructions to an instruction array 113. When a particular processor is free, the processor pulls the appropriate instruction from the array. The processor next executes the indicated function and provides the results to a designated GPR 108. At the appropriate time, the arbitration circuit selects a next instruction for that particular processor from the table and supplies the instruction to the array, such that the processor has a next instruction queued when it completes the current instruction.

The system also includes an instruction available register 130 that is used to designate whether the instructions in the table 110 are available or not to the arbitration circuit 112. The instruction available register includes GPR bits or lines 132 that correspond to the GPRs 108 that are associated with the processors 100. The system sets the bit of the instruction available register that corresponds to the GPR that is then being written, and is thus unavailable. This, in turn, sets unavailable lines for instructions that use the data that is held in that particular GPR. As discussed in more detail below, the unavailable line(s) remain set until the data is verified if the GPR is associated with an instruction that includes a set DV bit.

Consider the embodiment in which the DV bit is included in the LOAD instruction. The execution circuit 116, on lines 230, provides to the instruction available register 130 information that identifies the GPR involved in a LOAD operation. The instruction available register 130 sets the GPR bit 132 that corresponds to the designated GPR.

The table 110 includes in each row GPR ID bits 121 and associated AND gates 116. The AND gates assert an unavailable signal for a given row when the set GPR bit 132 matches an associated set GPR ID bit 121.

The execution circuit further provides to an AND gate 236, on line 232, the state of the DV bit in the LOAD instruction and, on line 234, an indication of the status of the current data verification operation. If the DV bit in the LOAD instruction is set to indicate that the associated data must be verified before use, the register, or alternatively, the unavailable line, is not allowed to change state until the signal on line 234 indicates that the data verification operation is complete. If the DV bit is not set, the register or line resets when the execution circuit signals that the associated GPR is available, i.e., signals that the data has been written to the designated GPR.

While the unavailable line is asserted, the associated instructions thus will not issue. The arbitration circuit 112 instead selects available instructions for the respective processors assuming such instructions are then held in the table 110.

Figure 5:
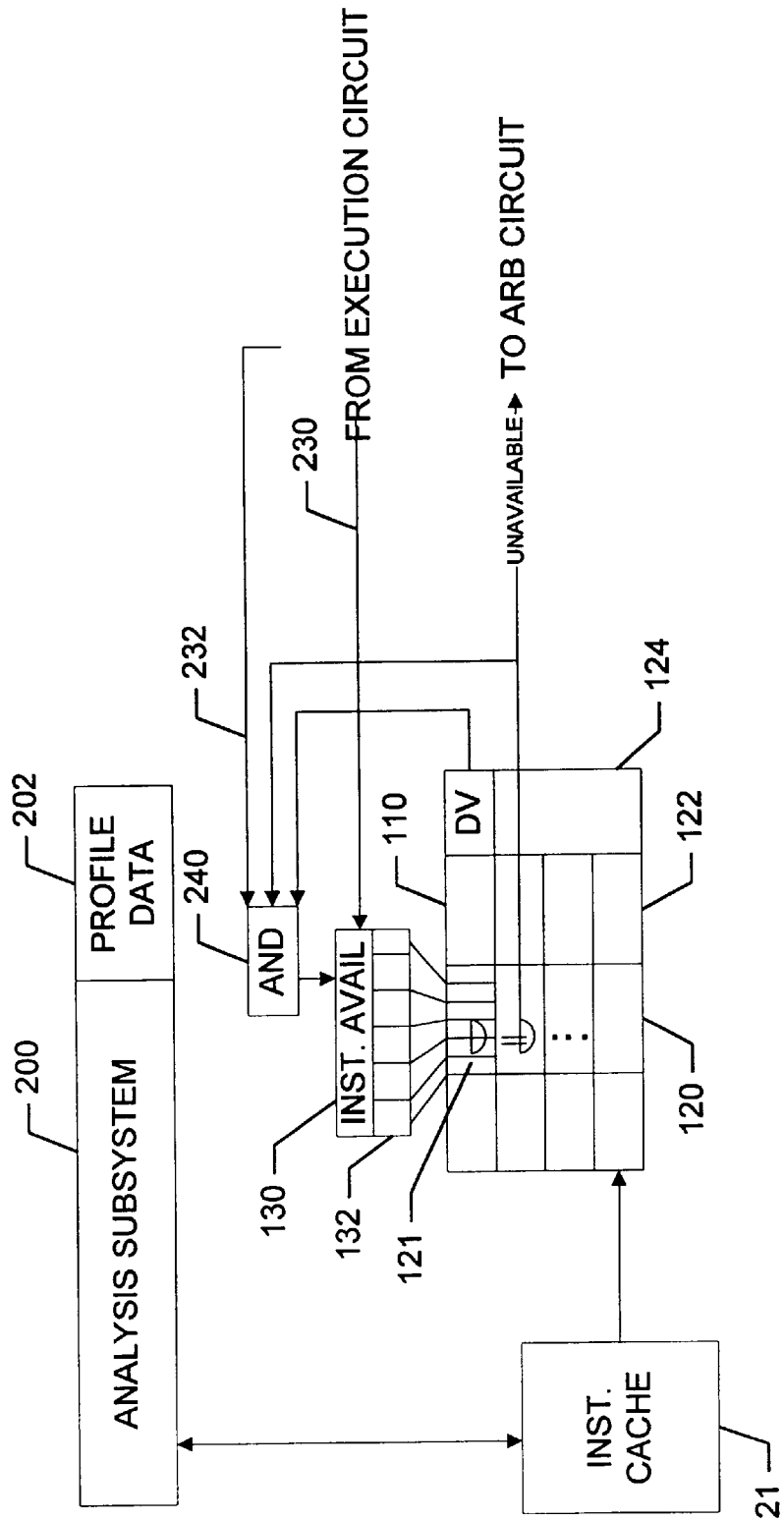
FIG. 5 is a functional block diagram of a system with an alternative an issue/queue table.

Referring now to FIG. 5, when the DV bit is included in the user instruction, the table 110 includes a DV column 124 that registers the state of the corresponding DV bit. The unavailable signal is reset under the control of an AND gate 240 that receives the status of the data verify operation on line 232, and the state of the DV bit from the table 110. When the associated GPR is being written, the unavailable signal is asserted, and if the DV bit is set, the AND gate 240 prevents the register 130 or, alternatively, the associated unavailable line, from resetting itself until the data verified signal on line 234 signifies that the associated data verify operation is completed. Otherwise, the register or line, as appropriate, resets when the execution circuit 114 signals that the associate GPR has been written.

Regardless of which instructions contain the DV bit, the system operates in a known manner after the data verification operation is complete, based on the confirmation of a cache hit or a cache miss.

The current system uses the DV bits to more efficiently control the issue of selected dependent instructions in order to avoid particularly time consuming re-issue operations. The system may also use the DV bits when it re-compiles the program, such that dependent user instructions are separated from the associated LOAD instructions by intermediate instructions that are not dependent on the LOAD instruction. The system then issues the intermediate instructions while the data verification operation takes place, and the processors are therefore in relatively constant use. This is in contrast to prior systems that queue instructions for issue without prior consideration of whether a particular user instruction requires data verification to avoid disruptions of the program operation that are associated with particularly complex and time consuming re-issue operations.

The DV bit may instead be set by a user based on the results of an analysis of the instruction set and/or prior uses of the software.

What is claimed is:

1. A system for designating instruction access to data, the system including:
   A. a data verify bit included in an instruction, the data verify bit being set to a predetermined state by an analysis subsystem when the instruction is to be associated with verified data; and B. an arbitration circuit that issues an instruction after data verification if the state of the associated data verify bit is set.

2. The system of claim 1 wherein
   a. the data verify bit is included in a LOAD instruction, the bit being set when a dependent user instruction is to use verified data, and
   b. the arbitration circuit issues the dependent user instruction after the data associated with the load instruction is verified.

3. The system to claim 1 wherein
   a. the data verify bit is included in a user instruction, the bit being set when the user instruction is to use verified data,
   b. the arbitration circuit issues the user instruction after the data on which the user instruction depends is verified.

4. The system of claim 1 wherein the data verify bit is set in the instruction based on an analysis of an instruction set that includes the instruction, the analysis determining how separated a LOAD instruction and a dependent user instruction are in the instruction set, with the data verify bit being set if the two instructions are close enough that the user instruction would likely issue if the data verify bit were not set.

5. The system of claim 1 wherein the data verify bit is set in the instruction based on an analysis of an instruction set that includes the instruction, the analysis
   a. determining if a dependent user instruction is close enough to a given LOAD instruction such that the dependent user instruction is likely to issue, and
   b. if so, the associated data verify bit is set to prevent the dependent user instruction from issuing before data verification.

6. The system of claim 1 wherein the data verify bit is set in the instruction based on an analysis of an instruction set that includes the instruction, the analysis
   a. determining a chain of instructions that depend from a given LOAD instruction in a set of instructions, and
   b. the associated data verify bit being set to prevent a first dependent instruction in a chain that is longer than a predetermined number of instructions.

7. The system of claim 1 wherein the data verify bit is set in the instruction based on an analysis of an instruction set that includes the instruction, the analysis
   a. determining a chain of instructions that depend from a given LOAD instruction in a set of instructions, and
   b. the associated data verify bit being set in at least a first dependent instruction in a chain that is longer than a predetermined number of instructions if the first dependent instruction is spaced in the set of instructions relative to the LOAD instruction such that the dependent instruction would likely issue if the data verify bit is not set.

8. The system of claim 1 wherein the data verify bit is set in the instruction based on an analysis of an instruction set that includes the instruction, the analysis
   a. determining from profile data which cache misses are associated with time-consuming reissue operations;
   b. the associated data verify bit being set to prevent associated user instructions from issuing before the associated data is verified.

9. The system of claim 8 wherein the analysis further determines from the profile data which of the cache misses of interest are likely to occur.

10. A system for designating instruction access to data, the system including:
    A. an analysis subsystem for determining if a given user instruction is to be associated with verified data;
    B. a data verify bit included in an instruction, the data verify bit being set to a predetermined state by the analysis subsystem when the instruction is to be associated with verified data; and
    C. an arbitration circuit that issues the user instruction after data verification if the state of the associated data verify bit is set.

11. The system of claim 10 wherein the analysis subsystem determines how separated a LOAD instruction and a dependent user instruction are in an instruction set and sets the data verify bit in a LOAD instruction if the two instructions are close enough that a dependent user instruction would likely issue if the data verify bit were not set.

12. The system of claim 10 wherein the analysis subsystem
    a. determines if a dependent user instruction is close enough to a given LOAD instruction such that the dependent user instruction is likely to issue, and
    b. if so, sets an associated data verify bit in the LOAD instruction to prevent the dependent user instruction from issuing before data verification.

13. The system of claim 10 wherein the analysis subsystem
    a. determines a chain of instructions that depend from a given LOAD instruction in a set of instructions, and
    b. sets the data verify bit in the LOAD instruction to prevent a first dependent instruction in a chain that is longer than a predetermined number of instructions.

14. The system of claim 13 wherein the analysis subsystem
    a. determines a chain of instructions that depend from a given LOAD instruction in a set of instructions, and
    b. sets an associated data verify bit in the LOAD instruction if at least a first dependent instruction in a chain that is longer than a predetermined number of instructions is spaced in the set of instructions relative to the LOAD instruction such that the dependent instruction would likely issue if the data verify bit is not set.

15. The system of claim 10 wherein the analysis subsystem
    a. determines from profile data which cache misses are associated with time-consuming reissue operations;
    b. sets the data verify bit in a given LOAD instruction associated with a cache miss of interest to prevent associated user instructions from issuing before the associated data is verified.

16. The system of claim 15 wherein the analysis subsystem further determines from the profile data which of the cache misses of interest are likely to occur and sets the bits in the LOAD instructions that are associated with the most likely cache misses of interest.

17. A system for designating instruction access to data, the system including:
    A. an analysis subsystem for determining if a given user instruction is to be associated with verified data;
    B. a data verify bit included in a user instruction, the data verify bit being set by the analysis subsystem when the user instruction is to be associated with verified data; and
    C. an arbitration circuit that issues the user instruction after the data on which the user instruction depends is verified, if the state of the associated data verify bit is set.

18. The system of claim 17 wherein the analysis subsystem determines how separated a LOAD instruction and a dependent user instruction are an instruction set and sets the data verify bit in the dependent user instruction f the two instructions are close enough that the user instruction would likely issue if the data verify bit were not set.

19. The system of claim 17 wherein the analysis subsystem
   a. determines if a dependent user instruction is close enough to a given LOAD instruction such that the dependent user instruction is likely to issue, and
   b. if so, sets the data verify bit in the user instruction to prevent the instruction from issuing before data verification.

20. The system of claim 17 wherein the analysis subsystem
   a. determines a chain of instructions that depend from a given LOAD instruction in a set of instructions, and
   b. sets an associated data verify bit in at least the first dependent user instruction in the chain if the chain that is longer than a predetermined number of instructions.

21. The system of claim 20 wherein the predetermined number of instructions in the number of instructions that can issue during the data verification operation.

22. The system of claim 17 wherein the analysis subsystem
   a. determines a chain of instructions that depend from a given LOAD instruction in a set of instructions, and
   b. sets an associated data verify bit in at least the first dependent user instruction in the chain if the chain is longer than a predetermined number of instructions and the first dependent instruction is spaced in the set of instructions relative to the LOAD instruction such that the dependent instruction would likely issue if the data verify bit is not set.

23. The system of claim 17 wherein the analysis subsystem
   a. determines from profile data which cache misses are associated with time-consuming reissue operations;
   b. sets the data verify bit in the user instructions that depend on the data associated with the cache misses of interest to prevent associated user instructions from issuing before the associated data is verified.

24. The system of claim 23 wherein the analysis subsystem further determines from the profile data which of the cache misses of interest are likely to occur, and sets the bits in the user instructions that are associated with most likely cache misses.

25. A system for designating instruction access to data, the system including:
   A. an analysis subsystem for determining if a given user instruction is to be associated with verified data;
   B. a data verify bit included in an instruction, the data verify bit being set by the analysis subsystem when the instruction is to be associated with verified data; and
   C. a compiler that compiles instructions that include the data verify bits and separates in the compiled instruction set a given LOAD instruction and a first dependent user instruction that are associated with one or more set data verify bits.

26. The system of claim 25 wherein the compiler separates the LOAD instruction and the dependent user instructions by at least the number of instructions that can issue during a data verification operation.

27. The system of claim 25 wherein the analysis system determines from profile data which cache misses are likely to occur and the compiler separates the LOAD and user instructions associated with the most likely cache misses.

28. A method for designating instruction access to data, the method including:
   A. analyzing if a given user instruction is to be associated with verified data;
   B. setting a data verify bit to associate the user instruction with verified data; and
   C. issuing the user instruction after data verification if the state of the associated data verify bit is set.

29. The method of claim 28 wherein
   a. the step of setting the data verify bit includes setting the bit in a LOAD instruction from which the user instruction depends, and
   b. the step of issuing the user instruction includes issuing the user instruction after the data associated with the LOAD instruction is verified.

30. The method of claim 28 wherein
   a. the step of setting the data verify bit includes setting the bit in the user instruction, and
   b. the step of issuing the user instruction includes issuing the user instruction after the data on which the instruction depends is verified.

31. The method of claim 28 wherein
   a. the step of analyzing includes determining how separated a LOAD instruction and a dependent user instruction are an instruction set, and
   b. the step of setting the data verify bit includes setting the bit if the two instructions are close enough that the user instruction would likely issue if the data verify bit were not set.

32. The method of claim 28 wherein
   a. the step of analyzing includes determining if a dependent user instruction is close enough to a given LOAD instruction such that the dependent user instruction is likely to issue, and
   b. the step of setting the data verify bit includes setting the bit to prevent the dependent user instruction from issuing before data verification.

33. The method of claim 28 wherein
   a. the step of analyzing includes determining a chain of instructions that depend from a given LOAD instruction in a set of instructions, and
   b. the step of setting an associated data verify bit includes setting the bit in a first dependent instruction in a chain that is longer than a predetermined number of instructions.

34. The method of claim 28 wherein
   a. the step of analyzing includes determining a chain of instructions that depend from a given LOAD instruction in a set of instructions, and
   b. the step of setting an associated data verify bit includes setting the bit in at least a first dependent instruction in a chain that is longer than a predetermined number of instructions if the first dependent instruction is spaced in the set of instructions relative to the LOAD instruction such that the dependent instruction would likely issue if the data verify bit is not set.

35. The method of claim 28 wherein
   a. the step of analyzing includes determining from profile data which cache misses are associated with time-consuming reissue operations;
   b. The step of setting the data verify bit includes setting the bit to prevent user instructions associated with the cache misses of interest from issuing before the associated data is verified.

36. The method of claim 35 wherein the step of analyzing further includes determining from the profile data which of the cache misses of interest are likely to occur.

37. A method for designating instruction access to data, the method including the steps of:
   A. analyzing an instruction set to determine if a given user instruction is to be associated with verified data;
   B. setting a data verify bit in a LOAD instruction when the analysis determines that a dependent user instruction is to be associated with verified data; and
   C. issuing the user instruction after data verification if the state of the associated data verify bit is set.

38. The method of claim 37 wherein
   a. the analyzing step includes determining how separated a LOAD instruction and a dependent user instruction are in an instruction set, and
   b. the setting the data verify bit step includes setting the bit if the two instructions are close enough that the user instruction would likely issue if the data verify bit were not set.

39. The method of claim 37 wherein
   a. the analyzing step includes determining if a dependent user instruction is close enough to a given LOAD instruction such that the dependent user instruction is likely to issue, and
   b. the setting the data verify bit step includes setting the bit in the LOAD instruction to prevent the dependent user instruction from issuing before data verification.

40. The method of claim 37 wherein
   a. the analyzing step includes determining a chain of instructions that depend from a given LOAD instruction in a set of instructions, and
   b. the setting the data verify bit step includes setting the bit in the LOAD instruction to prevent from issuing before data verification a first dependent instruction in a chain that is longer than a predetermined number of instructions.

41. The system of claim 37 wherein
   a. the step of analyzing includes determining a chain of instructions that depend from a given LOAD instruction in a set of instructions, and
   b. the setting the data verify bit step includes setting the bit in the LOAD instruction if at least a first dependent instruction in a chain that is longer than a predetermined number of instructions is spaced in the set of instructions relative to the LOAD instruction such that the dependent instruction would likely issue if the data verify bit is not set.

42. The method of claim 37 wherein
   a. the step of analyzing includes determining from profile data which cache misses are associated with time-consuming reissue operations;
   b. the step of setting the data verify bit includes setting the bit in the LOAD instructions associated with the cache misses of interest.

43. The method of claim 42 wherein the step of analyzing further includes determining from the profile data which of the cache misses of interest are likely to occur.

44. A method for designating instruction access to data, the method including:
   A. analyzing an instruction set to determine if a given user instruction is to be associated with verified data;
   B. setting a data verify bit in a user instruction, the data verify bit being set when the user instruction is to be associated with verified data; and
   C. issuing the user instruction after the data on which the user instruction depends is verified, if the state of the associated data verify bit is set.

45. The method of claim 44 wherein
   a. the analyzing step includes determining how separated a LOAD instruction and a dependent user instruction are an instruction set, and
   b. the step of setting the data verify bit includes setting the bit in the dependent user instruction if the two instructions are close enough that the user instruction would likely issue if the data verify bit were not set.

46. The method of claim 44 wherein
   a. the analyzing step includes determining if a dependent user instruction is close enough to a given LOAD instruction such that the dependent user instruction is likely to issue, and
   b. the setting the data verify bit step sets the bit in the user instruction to prevent the instruction from issuing before data verification.

47. The method of claim 44 wherein
   a. the analyzing step includes determining a chain of instructions that depend from a given LOAD instruction in a set of instructions, and
   b. the step of setting the data verify bit includes setting the bit in at least the first dependent user instruction in the chain if the chain that is longer than a predetermined number of instructions.

48. The method of claim 47 wherein the predetermined number of instructions is the number of instructions that can issue during the data verification operation.

49. The method of claim 44 wherein
   a. the analyzing step includes determining a chain of instructions that depend from a given LOAD instruction in a set of instructions, and
   b. the step of setting the data verify bit includes setting the bit in at least the first dependent user instruction in the chain if the chain is longer than a predetermined number of instructions and the first dependent instruction is spaced in the set of instructions relative to the LOAD instruction such that the dependent instruction would likely issue if the data verify bit is not set.

50. The method of claim 44 wherein
   a. the step of analyzing includes determining from profile data which cache misses are associated with time-consuming reissue operations;
   b. The step of setting the data verify bit includes setting the bit in the user instructions associated with the cache misses of interest.

51. The method of claim 50 wherein the step of analyzing further includes determining from the profile data which of the cache misses of interest are most likely to occur.

52. A method for designating instruction access to data, the method including the steps of:
   A. analyzing a set of instructions to determine if a given user instruction is to be associated with verified data;
   B. setting a data verify bit in an instruction when the instruction is to be associated with verified data; and
   C. compiling instructions that include the data verify bits and separating in the compiled instruction set a given LOAD instruction and a first dependent user instruction that are associated with one or more set data verify bits.

53. The method of claim 52 wherein the step of compiling separates the LOAD instruction and the dependent user instructions by at least the number of instructions that can issue during a data verification operation.

* * * * *